United States Patent [19]
Prosky

[11] 4,283,921
[45] Aug. 18, 1981

[54] CONTROL AND ALARM SYSTEM FOR FREEZER CASE TEMPERATURE

[75] Inventor: Howard S. Prosky, Englewood, Colo.

[73] Assignee: Electromedics, Inc., Englewood, Colo.

[21] Appl. No.: 143,931

[22] Filed: Apr. 25, 1980

[51] Int. Cl.³ .................. F25B 49/00; G05B 15/00; G05B 23/00
[52] U.S. Cl. .................................. 62/126; 62/223; 62/130; 236/78 R; 236/94
[58] Field of Search .................. 62/126, 130, 223; 236/78 R, 91 G, 47, 46 R, 94; 165/27, 11 R

[56] References Cited
U.S. PATENT DOCUMENTS

| 3,431,399 | 3/1969 | Venning | 236/78 R |
| 3,942,718 | 3/1976 | Palmieri | 236/78 R |
| 4,154,397 | 5/1979 | Carlson | 236/47 |
| 4,200,910 | 4/1980 | Hall | 236/46 R |
| 4,234,927 | 11/1980 | First | 165/11 R |
| 4,240,077 | 12/1980 | Hughes et al. | 62/126 |

Primary Examiner—William E. Wayner
Assistant Examiner—Harry Tanner
Attorney, Agent, or Firm—Gary M. Polumbus

[57] ABSTRACT

The temperature within a freezer case or refrigeration compartment is operatively determined and controlled by a control system employing a microcomputer which operatively controls a refrigeration system associated with the freezer case. A sensing element is operatively connected to the microcomputer for supplying a signal representative of the freezer compartment temperature. Temperature selector switches establish upper and lower limits of a desired range of temperatures for the freezer case and another selector switch establishes an alarm condition temperature limit. The microcomputer follows a program of comparing the compartment temperature to the upper limit, the lower limit and the alarm condition limit. During normal operation, the microcomputer also controls a refrigerant valve to regulate the compartment temperature within the desired range. If the compartment temperature elevates to the alarm condition limit, the microcomputer energizes a first alarm. If the alarm condition remains for a predetermined time period, a second emergency alarm is energized.

9 Claims, 2 Drawing Figures

CONTROL AND ALARM SYSTEM FOR FREEZER CASE TEMPERATURE

BACKGROUND OF THE INVENTION

This invention pertains to a control system for a refrigeration system, and more particularly to a system particularly adaptable for controlling a refrigeration system used for cooling freezer cases and compartments typically employed in supermarkets, and for supplying an alarm indication upon the temperature in the freezer case reaching an alarm condition stage.

Typically, bimetal switches or sensors are employed for controlling the refrigeration system of a supermarket freezer case. The bimetal switches are adjusted at preselected temperatures to define an upper and lower range of temperatures within which it is desired to maintain the freezer compartment temperature. When the freezer compartment temperature reaches the upper limit, a refrigeration control valve is opened to supply an additional amount of refrigeration fluid to the evaporator radiator located in the freezer compartment. When the temperature drops to the lower limit of the desired range, the valve is closed. Because bimetallic switches do not typically respond in a reliable and consistent manner to the freezer case temperature, it is necessary to set the upper and lower limits of the desired range unnecessarily low to assure that the refrigeration system will respond as is desired. As a result of the unnecessary low settings, the temperature in the freezer case is usually maintained lower than necessary to preserve the items in the freezer case, and the amount of energy consumed by the refrigeration system in cooling the compartment is increased. In addition, the additional cooling capacity required of the refrigeration system necessitates that the compressor and other elements of the system be of an increased capacity. It is to these and other problems in this field that the present invention is addressed.

SUMMARY OF THE INVENTION

Generally summarized, the inventive features of the present invention include a microcomputer processing means for accurately and precisely determining the temperature of the freezer case or refrigeration compartment, for accurately and precisely determining the relationship of the compartment temperature to upper and lower limit temperatures, and for operatively controlling the refrigeration system in response to the temperature determinations. The upper and lower freezer compartment temperatures are established by means including selector switches. The upper and lower limits of the desired temperature range can be established at precise and closely related temperatures. The precise control over the system by the microcomputer allows the desired range of temperatures to be established no lower than necessary to maintain the desired cooling effect within the compartment. The minimal differential between the upper and lower limits, the establishment of the desired range no lower than necessary, and the precise nature of the temperature determination from the microcomputer all combine to achieve a control system which utilizes less energy and is lower in cost because the capacity of certain of the refrigeration system elements can be reduced.

In addition to controlling the operation of the refrigeration system, another aspect of the present invention relates to providing one or more alarm indications should the temperature of the freezer case or refrigeration compartment reach an alarm condition limit and maintain the alarm condition for a predetermined time. During defrost cycles or the like, the temperature of the compartment will be elevated beyond the desired range. The alarm feature of the system allows an indication of such a condition. However, should the elevated temperature be maintained for a predetermined time period typically longer than the defrost time cycle, the alarm system provides a second emergency alarm indication. The provision for two alarm indications under different conditions allows close supervision of the operation of the refrigeration system and the temperature in the freezer compartment. The alarm indications provide sufficient opportunity to detect any adverse effects and take corrective action before detrimental effects occur in the freezer case.

A more complete understanding of the invention is available from the following detailed description of the preferred embodiment and from the drawings briefly described below.

DESCRIPTION OF THE PREFERRED EMBODIMENT

Figure 1:
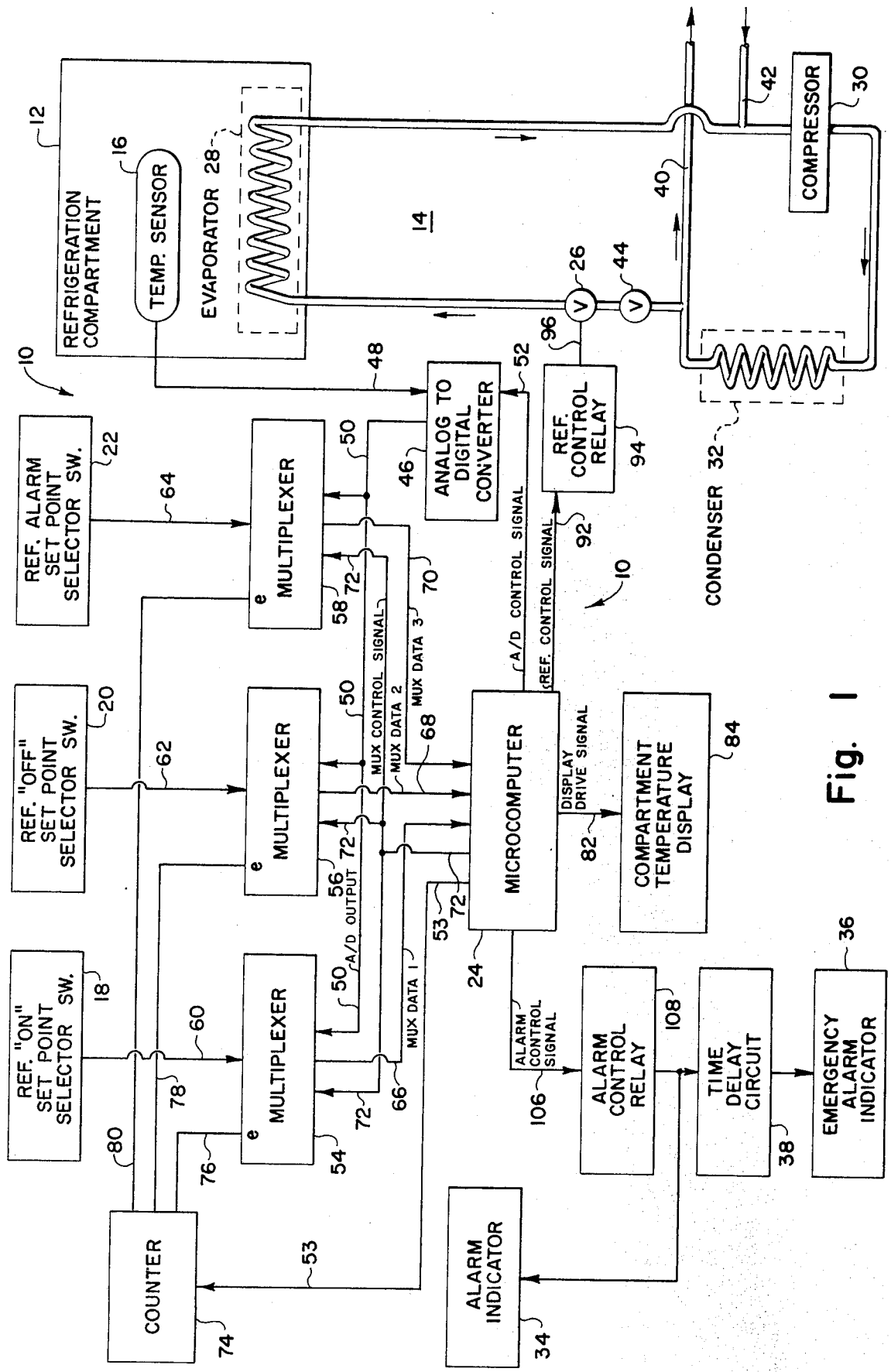
FIG. 1 is a schematic diagram illustrating the control and alarm system of the present invention in block diagram form, in use with a refrigeration compartment and a refrigeration system also shown in schematic form.

The system generally referenced 10 in FIG. 1 operatively controls the temperature within a refrigeration compartment 12. The desired thermal effect in the refrigeration compartment 12 is controlled by a refrigeration system generally referenced 14.

The system 10 includes a temperature sensor 16 which is thermally coupled or otherwise located within the refrigerator compartment 12. The temperature sensor 16 operatively supplies a signal indicative of the temperature of the compartment. The system 10 utilizes the compartment temperature signal in conjunction with an upper limit temperature signal established by selector switch 18, a lower temperature limit signal established by selector switch 20 and an alarm condition signal established by selector switch 22, to operatively control the refrigeration system 14. A microcomputer 24 of the system 10 operatively determines the control conditions and control effects over the refrigeration system. The microcomputer 24 operatively controls a controllable fluid flow valve 26 included within the refrigeration system. In addition the refrigeration system 14 includes the typical evaporator radiator 28 positioned in thermal relation within the refrigeration compartment, a compressor 30, a condenser radiator 32, and the typical assorted thermodynamic fluid circulation conductors. The controllable valve 26 operatively regulates the flow of thermodynamic fluid through the evaporator 28 or other radiator in the refrigeration compartment 12 and thereby regulates and controls the thermal effect and temperature within the compartment.

In addition to controlling the temperature in the refrigeration compartment 12, the system 10 operatively supplies an alarm indication upon the compartment temperature reaching an alarm condition temperature established by the selector switch 22. The microcomputer 24 operatively energizes an alarm indicator 34 upon the compartment temperature reaching the alarm condition temperature. In addition, a second or emergency alarm indicator 36 is operatively energized after a predetermined time delay established by circuit means 38 after the first alarm indicator 34 is energized.

The system 10 is particularly advantageous for use in controlling the temperature of supermarket freezer cases. In such application the freezer case is the refrigeration compartment 12. The refrigeration system 14 lowers the temperature within the freezer case or compartment 12 and cools it to a temperature significantly below ambient temperature. The refrigeration system 14 is exemplary of the typical freezer case refrigeration system. A single compressor 30 is provided which compresses and delivers the hot compressed thermodynamic fluid to the condenser 32. The thermodynamic fluid is cooled into liquid state and is supplied through a liquid supply conductor 40. Each freezer case or compartment 12 receives liquid thermodynamic fluid from the liquid supply conductor 40 at its individual evaporator 28. Each freezer case or compartment 12 is connected in parallel relation between the liquid supply conductor 40 of the system 14 and a gas return conductor 42 returning the thermodynamic fluid to the compressor 30. The liquid thermodynamic fluid supplied to the evaporator 28 in each compartment 12 cools the compartment as the fluid expands in the evaporator, as is well known. The extent or the amount of cooling obtained in the compartment 12 is controlled by the amount of thermodynamic fluid flowing through the evaporator. The amount of fluid flowing through the evaporator is controlled by the controllable fluid flow valve 26. Increasing the amount of thermodynamic fluid through the valve increases the cooling effect in the compartment 12, and reducing the amount of thermodynamic fluid through valve 26 reduces the cooling effect in compartment 12. The valve 26 exemplifies one example of refrigeration control means for operatively controlling the thermal effect of the refrigeration system with the compartment. In addition, a manually controlled defrost valve 44 is provided for completely terminating the fluid flow through the evaporator 28 when it is desired to defrost the compartment 12. Closing valve 44 renders valve 26 ineffective in controlling the refrigeration system.

Details of the nature and operation of the system 10 follow.

The temperature sensor 16 may take the form of a variety of well known temperature sensing devices. Typically the temperature sensor 16 will include a thermistor or other electrical means which creates an electrical characteristic that varies in a predetermined manner in relation to the temperature experienced or sensed by the temperature sensor 16. If a thermistor is utilized, the resistance of the thermistor varies in a non-linear relation to the temperature. A current source (not shown) is connected to direct current through the thermistor, and a voltage signal is derived which is related to the thermistor resistance and hence to the compartment temperature. The magnitude of this analog voltage signal varies in a predetermined relation with the temperature of the thermistor. Thus, the combination of a thermistor and current source, or other well known temperature sensing devices, form one example of a means for creating an electrical characteristic signal related to the actual temperature sensed within the compartment 12.

An analog to digital converter 46 of the system 10 converts the electrical characteristic signal to a digital compartment temperature signal. The converter 46 receives the electrical characteristic signal on a group of conductors 48 from the temperature sensor 16, and the converter 46 supplies the digital compartment temperature signal on conductor 50. Conductor 50 applies the compartment temperature signal to one input of a first multiplexer 54, of a second multiplexer 56 and of a third multiplexer 58. The microcomputer 24 controls the converter 46 by signals supplied over a group of conductors 52. One example of the nature and operation of the temperature sensor 16 and the analog to digital converter 46, as controlled by a microcomputer, is disclosed in U.S. Pat. No. 4,161,880, assigned to the assignee of this invention.

The first selector switch 18 preferably is a selectively operable switch for establishing a binary coded decimal digital electrical limit signal which represents one limit temperature of a range of desired temperatures within which it is desired to regulate the temperature of the compartment 12. Preferably, the selector switch 18 establishes the upper limit temperature of the desired range of temperatures. In the freezer case application, the upper limit temperature is that temperature at which it is desired to initiate increased cooling of the refrigeration compartment. When the actual compartment temperature reaches the upper limit temperature, it is desired to increase or start the flow of thermodynamic fluid through the evaporator 28 to reduce the compartment temperature within the range of desired temperatures. The first or upper limit signal from switch 18 is supplied over a group of conductors 60 to another input to the first multiplexer 54. The selector switch 18, as well as the selector switches 20 and 22, are conventional items such as binary coded decimal thumb wheel selector switches.

The selector switch 20 selectively establishes a second binary coded decimal digital electrical limit signal which represents the other limit temperature of the range of desired temperatures within which it is desired to regulate the temperature of the compartment 12. The second limit signal from the switch 20 is applied over a group of conductors 62 to another input of the second multiplexer 56. Preferably, the selector switch 20 establishes the lower limit temperature of the desired range. In the freezer case application, the lower limit temperature is that temperature at which it is desired to terminate or restrict the increased cooling effect in the refrigeration compartment 12. Once the actual compartment temperature has reached the lower limit of the desired range, the cooling effect of the evaporator 28 can be terminated or restricted.

The selector switch 22 selectively establishes a binary coded decimal digital electrical alarm condition signal which is representative of a predetermined temperature outside of the range of desired temperatures at which an alarm condition temperature within the compartment 12 occurs. In the freezer case application, the alarm condition temperature is above the desired range of temperatures within which it is desired to normally regulate the temperature of the compartment. The alarm condition temperature thereby defines a temperature limit at which it is desired to indicate an alarm situation. The alarm indications provided by indicators 34 and 36 are useful in signalling the event that a possible malfunction of the refrigeration system has occurred, or that the refrigeration compartment is being defrosted, or both conditions, as well as others. The alarm condition signal is supplied by the switch 22 on a group of conductors 64 and is applied as one input to the third multiplexer 56.

Each of the multiplexers 54, 56 and 58 perform the well known function of supplying signals from their inputs over a group of output conductors when appropriately controlled and enabled. The microcomputer 24 supplies a multiplexer control signal on a group of conductors 72. The multiplexers are enabled by a counter 74 having three output conductors 76, 78 and 80 connecting with each enable input of the multiplexers 54, 56 and 58, respectively. The counter 74 applies a single high signal on each of the conductors 76, 78 and 80 in sequence under control of signals supplied from the microcomputer 24 over a group of conductors 53, thereby enabling each of the multiplexers 54, 56 and 58, respectively, in sequence. Each multiplexer in the enabling sequence supplies its input signals over its group of output conductors to the microcomputer 24. The enabling sequence is periodically repeated in accordance with the program of the microcomputer as explained in conjunction with FIG. 2. When enabled and controlled, the first multiplexer 54 operatively supplies both the compartment temperature signal from conductors 50 and the first or upper limit signal from conductors 60 to the microcomputer 24 over conductors 66. Similarly, when controlled and enabled, the second multiplexer 56 operatively supplies the compartment temperature signal on conductors 50 and the second or lower limit signal on conductors 62 to the microcomputer 24 over conductor 68. When enabled and controlled, the third multiplexer 58 likewise supplies the compartment temperature signal from conductor 50 and the alarm condition signal on conductor 64 to the microcomputer 24 over conductor 70.

The microcomputer 24 operatively functions as a computer means to receive the signals from conductors 66, 68 and 70, to perform various logical determinations and calculations from the signals, and to control the refrigeration system 14 in relation to the compartment temperature signal and the first and second limit signals, as well as control and energize the alarms 34 and 36 upon the determination that the compartment temperature signal bears a predetermined relationship to the alarm condition signal. In addition, the microcomputer 24 supplies a display drive signal on a group of conductors 82 to a display 84, which energizes the display 84 to display the actual compartment temperature. The program defining the operative functions of the computer means or microcomputer 24, when the system 10 is utilized to cool the refrigeration compartment 12, is illustrated by the flow diagram shown in FIG. 2.

The program and functional operation of the microcomputer 24 begins at a start condition 86 when the program counter of the microcomputer is reset. After the compartment temperature signal, the first or upper limit signal, the second or lower limit signal and the alarm condition signal have been read into and recorded within the memory of the microcomputer 24, the program begins by determining if the compartment temperature is above the first or upper limit temperature as is represented at 88. The upper limit temperature is that temperature at which it is desired to turn on or initiate or increase the amount of refrigerant flowing through the evaporator of the refrigeration compartment to thereby increase the cooling effect within the compartment. If the compartment temperature is above the upper limit temperature, the microcomputer operatively opens the refrigeration control valve as is represented at 90. The program function represented at 90 is practically achieved by the microcomputer 24 delivering a refrigeration control signal on conductor 92 to a refrigeration control valve means or relay 94, as shown in FIG. 1. The refrigeration control relay 94 is mechanically connected by a linkage 96 to the refrigerant valve 26. The valve 26 is opened to increase the flow of thermodynamic fluid therethrough to the evaporator 28, thereby creating an enhanced cooling effect within the compartment 12 to reduce the compartment temperature. Referring back to FIG. 2, after the flow of thermodynamic fluid has been initiated or increased by opening the refrigeration control valve, or if the compartment temperature is less than or not above the upper limit temperature, the microcomputer next determines if the compartment temperature is below the second or lower limit temperature, as represented at 98. If the compartment temperature is below the lower limit, the microcomputer operatively turns off or restricts the refrigeration control valve, as represented at 100. In practical consequence, the step of turning off or restricting the refrigeration control valve is obtained by terminating the refrigeration control signal on conductor 92 to the control relay 94, as shown in FIG. 1. The mechanical linkage 96 is operatively moved to close or restrict the valve 26 to the flow of thermodynamic fluid, thereby terminating or restricting the cooling effect of the evaporator 28 in the compartment 12. If the compartment temperature is above the upper limit, the program proceeds to the step referenced at 100.

As a consequence of the operation described, the system 10 operatively controls the valve 26 to increase the cooling effect within the compartment 12 when the compartment temperature has risen above the upper limit of the desired range of temperatures. The cooling effect of the evaporator is maintained until the compartment temperature is reduced to the lower temperature limit, at which time the cooling effect is restricted or terminated by closing the valve 26.

In practical operation, the use of the control system 10 to operatively control the temperature of a typical supermarket freezer case has allowed the actual temperature of the freezer case to vary approximately one percent between the upper and lower limit temperatures. This relatively precise control contrasts with the typical prior art freezer control system which uses bimetallic switches to open and close the refrigeration control valve. Because of the inaccuracy of the bimetallic switches, the tendency in most supermarkets has been to set the upper and lower limits unnecessarily low to assure a sufficiently low and acceptable temperature within the freezer case. However, the precision obtainable by the system 10 allows the temperature in the compartment to be precisely regulated through a range of temperatures no lower than absolutely necessary to preserve the items in the freezer case. Energy savings, judged to be in the neighborhood of thirty percent, are obtainable by use of the present system 10 as compared to the prior art bimetallic switch control arrangement. In addition, the precise regulation over the valve 26 allows use of a compressor 30 of approximately one half the size or capacity typically needed by the bimetallic switch controlled system. A reduction in compressor capacity is obtained because less radical fluctuations in the demand for compressed or liquid thermodynamic fluid occur, because of the more finely regulated fluid flow to each compartment.

Figure 2:
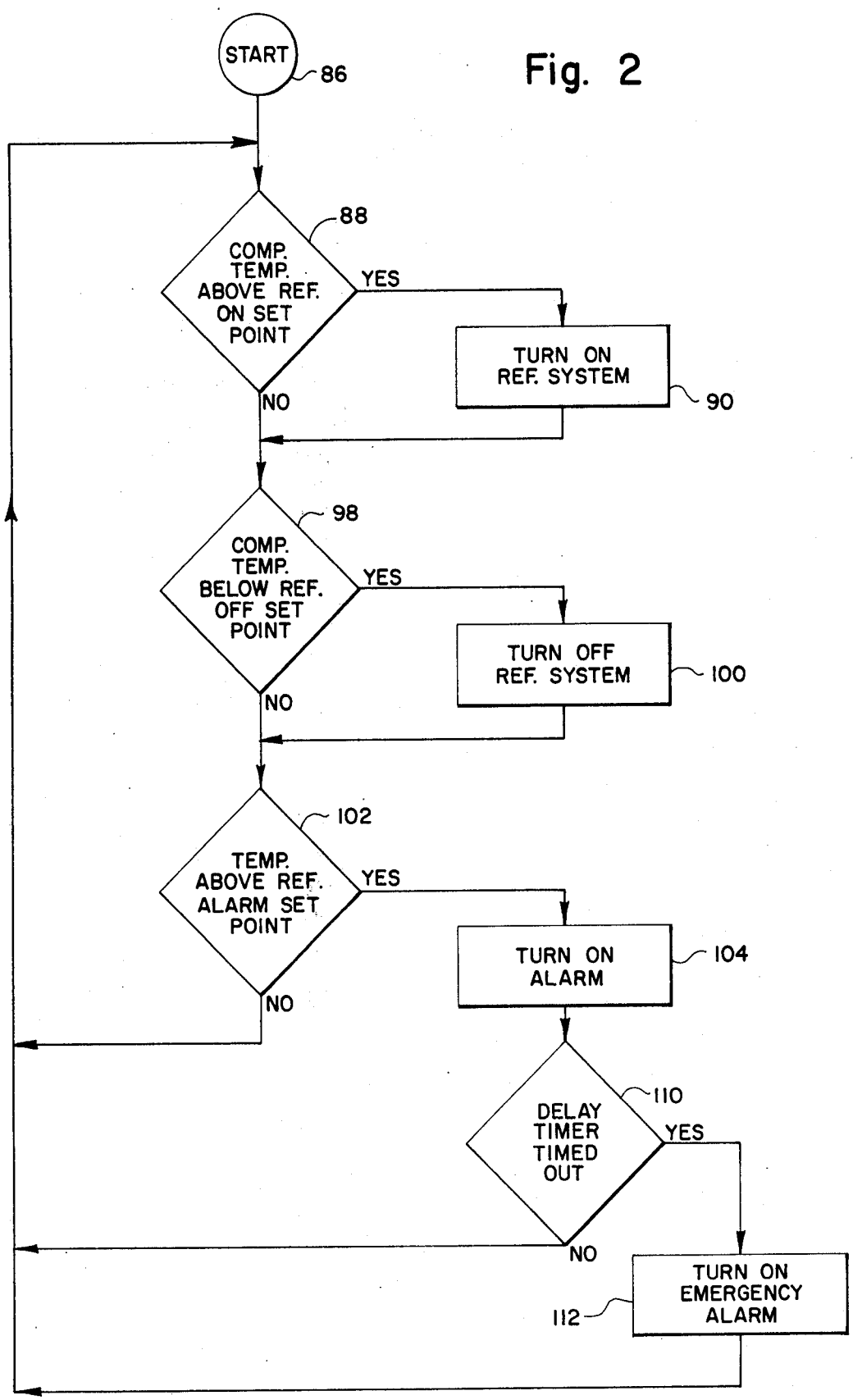
FIG. 2 is a flow diagram of the operation of a microcomputer of the control and alarm system illustrated in FIG. 1.

The alarm functions of the system 10 are also illustrated in FIG. 2. After the effects of the refrigeration system have been turned off or restricted as shown at 100, or if the compartment temperature is above the lower limit temperature, the microcomputer determines if the compartment temperature is above the alarm condition temperature, as shown at 102. The compartment temperature may raise above the upper temperature limit of the desired range if a malfunction of the refrigeration system occurs or if the manual valve 44 (FIG. 1) is closed during defrosting of the compartment 12. If the compartment temperature is below the alarm condition temperature, the program returns to the step referenced at 88. However, if the compartment temperature rises above the alarm condition temperature, the alarm is energized as shown at 104. In practicality, this function occurs when microcomputer 24 delivers an alarm control signal over conductor 106 to an alarm control means or relay 108, as shown in FIG. 1. The alarm control relay 108 immediately energizes the alarm indicator 34, which is the functional program step represented at 104 in FIG. 2. An indication from the alarm indicator 34 is a first level alarm. The first level alarm does not necessarily represent an undesired detrimental effect, but it does provide an initial warning that the operation of the refrigeration compartment 12 should be monitored, as for example during a defrost cycle.

Simultaneously with energizing the first alarm indicator 34, a time delay circuit 38 is energized, as shown in FIG. 1. The time delay circuit 38 delays delivering an energization signal to the emergency alarm indicator 36 for a predetermined time period. The predetermined time period is established to be a time period longer than that time period typically required to defrost the compartment 12. Referring to FIG. 2, a determination is made at 108 whether the time delay circuit has timed out. So long as the time delay circuit has not timed out, the program returns to the step referenced 88 and continues to execute. Once the time delay has timed out, the emergency alarm indicator 36 (FIG. 1) is energized as represented at 112. The emergency alarm will be energized only if the refrigeration system has not yet begun to sufficiently cool the refrigeration compartment after completion of the defrost cycle. This emergency alarm condition will typically exist only upon a malfunction of the refrigeration system. The extent of the predetermined time delay and the setting of the alarm condition temperature are related to one another in a manner to cause the issuance of an emergency alarm in sufficient time to allow the items in the refrigeration compartment to be removed and saved before the elevated alarm temperature condition exists for too long a time in the compartment 12. After the emergency alarm has been energized at 112, the program returns to the step referenced 88 and continues execution.

By repeating the complete sequence of the program disclosed in FIG. 1, rapid determination of the relationship of the compartment temperature to the limit and alarm conditions is possible. The thermal effects from the refrigeration system can be rapidly changed or regulated to maintain the temperature within the desired range. Since the temperature is maintained more precisely within a narrow range, a condition simulating a steady state condition is established, and that condition requires less energy to maintain than a widely fluctuating condition. Also repeating the program allows the compartment temperature relationship to the limits and the alarm conditions to be more precisely monitored, when they occur.

From the foregoing description, it is apparent that the system 10 of the present invention not only controls a supermarket freezer case or refrigeration compartment in a more precise and reliable manner, but does so in such a way to result in substantial energy savings and advantages over the prior art. In addition, the system 10 indicates at least two stages of alarm conditions to alert supervisors to possible detrimental conditions or malfunctions of the refrigeration system or compartment, at a time when the items within the compartment could be saved from serious adverse effects.

Although the preferred embodiment of the present invention has been described with a degree of specificity, it should be understood that the description has been made by way of example. Departures from the specificity of the described embodiment may be made without departing from the scope of the invention defined by the following claims.

What is claimed is:

1. A temperature control system for a refrigeration compartment, for use with a refrigeration system operatively controlling the temperature of said compartment, said refrigeration system including a refrigeration control means for operatively controlling the thermal effect of said refrigeration system within said compartment, said temperature control system comprising:

sensor means thermally coupled with said compartment for sensing the actual temperature within said compartment and for creating an electrical characteristic signal related to the actual temperature sensed;

converter means electrically connected with said sensor means, said converter means operatively converting the electrical characteristic signal of said sensor means into a compartment temperature signal;

first temperature selector means for selectively establishing a first limit signal representative of an upper limit temperature of a range of desired temperatures within which the temperature of said compartment is normally to be regulated;

second temperature selector means for selectively establishing a second limit signal representative of a lower limit temperature of the range of desired temperatures within which the temperature of said compartment is normally to be regulated;

first multiplexer means operatively connected to receive the compartment temperature signal and the first limit signal from said converter means and said first temperature selector means, respectively, and operative to supply both the compartment temperature and first limit signals when enabled;

second multiplexer means operatively connected to receive the compartment temperature signal and the second limit signal from said converter means and said second temperature selector means, respectively, and operative to supply both the compartment temperature and second limit signals when enabled;

enabling means operatively connected with said first and second multiplexer means for enabling said first and second multiplexer means in sequence; and computer means operatively connected to receive the signals from said first and second multiplexer means, said computer means operatively controlling said refrigeration control means of said refrigeration system in a manner predetermined by the relation of the compartment temperature signal to the first and second limit signals.

2. A temperature control system as defined in claim 1 further including in combination:

third temperature selector means for selectively establishing an alarm limit signal representative of a predetermined alarm condition temperature outside of the range of desired temperatures at which an alarm condition is to be signaled;

third multiplexer means operatively connected to receive the compartment temperature signal and the alarm limit signal from said converter means and said third temperature selector means, respectively, and operative to supply both the compartment temperature and alarm signals when enabled;

alarm means operatively connected for control by said computer means; and wherein:

said enabling means is also operatively connected with said third multiplexer means for enabling said first, second and third multiplexer means in sequence; and said computer means is also operatively connected to receive the signals from said third multiplexer means, and said computer means operatively controls said alarm means in a manner predetermined by the relation of the compartment temperature signal to the alarm limit signal.

3. A control system as defined in claims 1 or 2 wherein:

the predetermined manner by which said computer means operatively controls said refrigeration control means includes determining if the compartment temperature signal and the first and second limit signals indicate that the compartment temperature falls within or without of the range of desired temperatures; and said computer means operatively controls said refrigeration control means in relation to the determination of the relationship of compartment temperature signal and first and second limit signals to operatively create a thermal effect within the compartment for bringing the refrigeration compartment temperature within the desired range of temperatures.

4. A control system as defined in claim 3 wherein:

said refrigeration system is operatively arranged to cool said refrigeration compartment to the desired range of temperatures less than ambient temperature;

said refrigeration system includes a thermodynamic fluid circulation system having an evaporator radiator positioned within refrigeration compartment;

said refrigeration control means comprises a fluid control valve within said fluid circulation system, and said fluid control valve operatively controls the thermodynamic fluid flow to said evaporator radiator;

the predetermined manner by which said computer means operatively controls said fluid control valve includes:

determining if the compartment temperature signal and the first limit signal indicate that the compartment temperature is equal to or above the upper limit temperature; and determining if the compartment temperature signal and the second limit signal indicate that the compartment temperature is equal to or lower than the lower limit temperature; and said computer means operatively controls said fluid control valve to:

increase the flow of thermodynamic fluid through said fluid control valve when the compartment temperature is at and above the upper limit temperature; and restrict the flow of thermodynamic fluid through said fluid control valve when the compartment temperature is at and above the upper limit temperature.

5. A control system as defined in claim 4 wherein:

the alarm condition temperature is greater than the upper limit temperature;

said alarm means delivers at least one alarm indication when energized; and said computer means energizes said alarm means upon said alarm limit signal indicating that the compartment temperature is equal to or greater than the alarm condition temperature.

6. A control system as defined in claim 5 wherein said alarm means further comprises:

a first alarm which is immediately energized upon energization of said alarm means by said computer means;

a second emergency alarm; and delay means for energizing said second emergency alarm upon a predetermined delay after said first alarm is energized.

7. A system for controlling the temperature of a refrigeration compartment and for indicating an alarm temperature condition of said refrigeration compartment, for use with a refrigeration system operatively controlling the temperature of said compartment, said refrigeration system including a thermodynamic fluid circulation system having a heat radiator positioned in thermal relation with said compartment and also having a controllable fluid control valve within said fluid circulation system for varying the flow of thermodynamic fluid to said heat radiator to operatively control the thermal effect of said evaporator radiator within said compartment, said system comprising:

sensor means thermally coupled with said compartment for sensing the actual temperature within said compartment and for creating an analog electrical sensor signal related to the actual temperature sensed;

analog to digital converter means electrically connected with said sensor means to receive the sensor signal, said analog to digital converter means operatively converting the sensor signal into a digital compartment temperature signal;

a first temperature selector means selectively operable for establishing a first digital limit signal representative of an upper limit temperature of a range of desired temperatures within which the temperature of said compartment is normally to be regulated;

a second temperature selector means selectively operable for establishing a second digital limit signal representative of the lower limit temperature of the range of desired temperatures within which the temperature of said compartment is normally to be regulated;

a third temperature selector means selectively operable for establishing a digital alarm limit signal representative of a predetermined alarm condition temperature outside of the range of desired temperatures at which an alarm condition is to be signalled;

first multiplexer means operatively connected to receive the compartment temperature signal and the first limit signal from said converter means and said first temperature selector means, respectively, and operative to supply both the compartment temperature and first limit signals when enabled;

second multiplexer means operatively connected to receive the compartment temperature signal and the second limit signal from said converter means and said second temperature selector means, respectively, and operative to supply both the compartment temperature and second limit signals when enabled;

third multiplexer means operatively connected to receive the compartment temperature signal and the alarm limit signal from said converter means and said third temperature selector means, respectively, and operative to supply both the compartment temperature and alarm limit signals when enabled;

enabling means connected with said first, second and third multiplexer means for operatively enabling said first, second and third multiplexer means in sequence;

alarm means operatively connected for control by said computer means, said alarm means indicating an alarm condition when energized; and computer means operatively connected to control said first, second and third multiplexer means and said converter means, said computer means operatively controlling said multiplexers to supply the signals from each of said multiplexers to said computer means when said each multiplexer means is enabled, said computer means operatively utilizing the compartment temperature signal and the first and second limit signals and said alarm limit signal to determine if the compartment temperature falls within or without of the range of desired temperatures, said computer means further operatively supplying a refrigeration control signal to said fluid control valve of said refrigeration system to regulate said fluid control valve in a predetermined manner to create a desired thermal effect within said compartment to urge the compartment temperature within the desired range of temperatures, said computer means further operatively determining if said compartment temperature reaches the alarm condition temperature, and said computer means further operatively delivering an alarm control signal to said alarm means to energize said alarm means upon determining that the compartment temperature has reached the alarm condition temperature.

8. A system as defined in claim 7 wherein:

said refrigeration system is operatively arranged to cool said refrigeration compartment to the desired range of temperature less than ambient temperature of said compartment;

said heat radiator is an evaporator radiator of said refrigeration system; and said computer means operatively controls said fluid control valve by
  determining if the compartment temperature is equal to or above the upper limit temperature and operatively controlling the fluid control valve to increase the flow of thermodynamic fluid to the evaporator radiator upon the compartment temperature reaching or exceeding the alarm condition temperature; and
  determining when the compartment temperature is equal to or lower than the lower limit temperature and operatively controlling the fluid control valve to restrict the flow of thermodynamic fluid to the evaporator radiator upon the compartment temperature reaching or falling below the alarm condition temperature.

9. A system as defined in claim 8 wherein:

the alarm temperature is greater than the upper limit temperature; and said alarm means further comprises:
  a first alarm indicator which is operative in response to the alarm control signal from said computer means to immediately indicate a first alarm condition;
  a second alarm indicator operative to deliver a second alarm indication when energized; and
  time delay means operatively connected to receive the alarm control signal from said microcomputer and to energize said second alarm indicator a predetermined time period after the application of the alarm control signal.

* * * * *